United States Patent Office 3,099,967
Patented Aug. 6, 1963

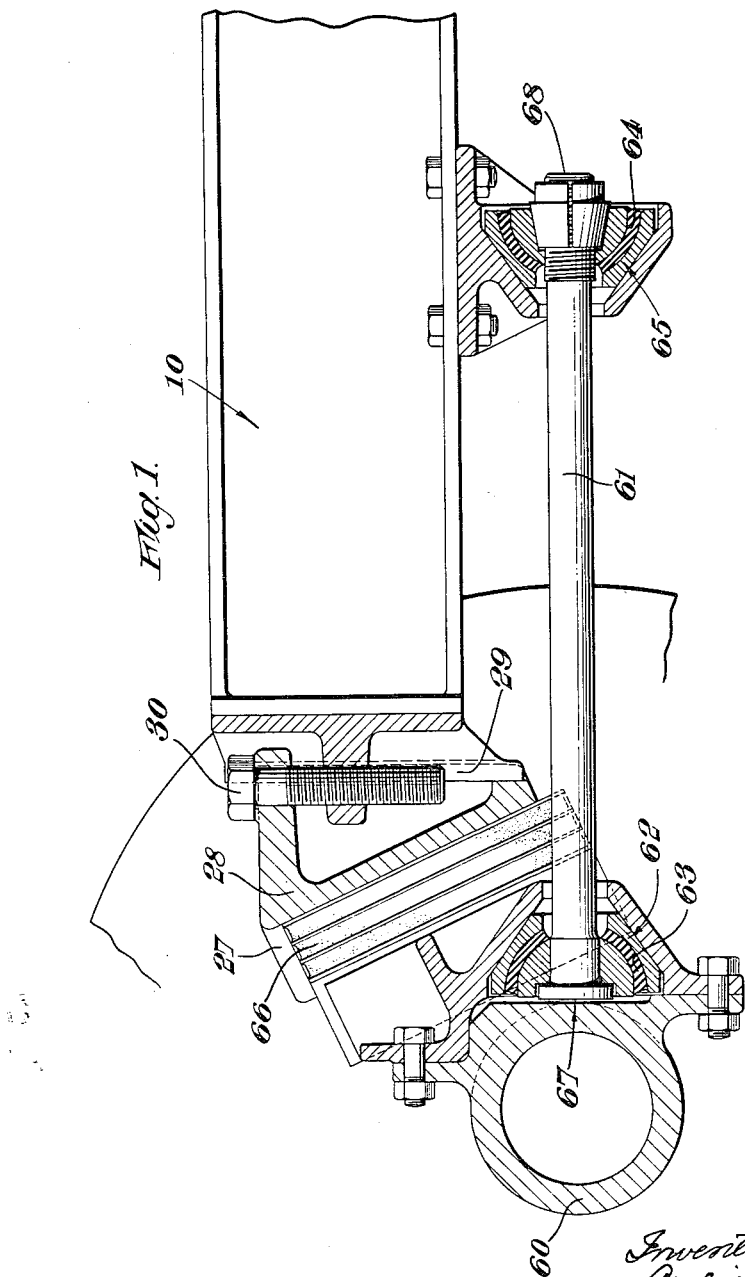

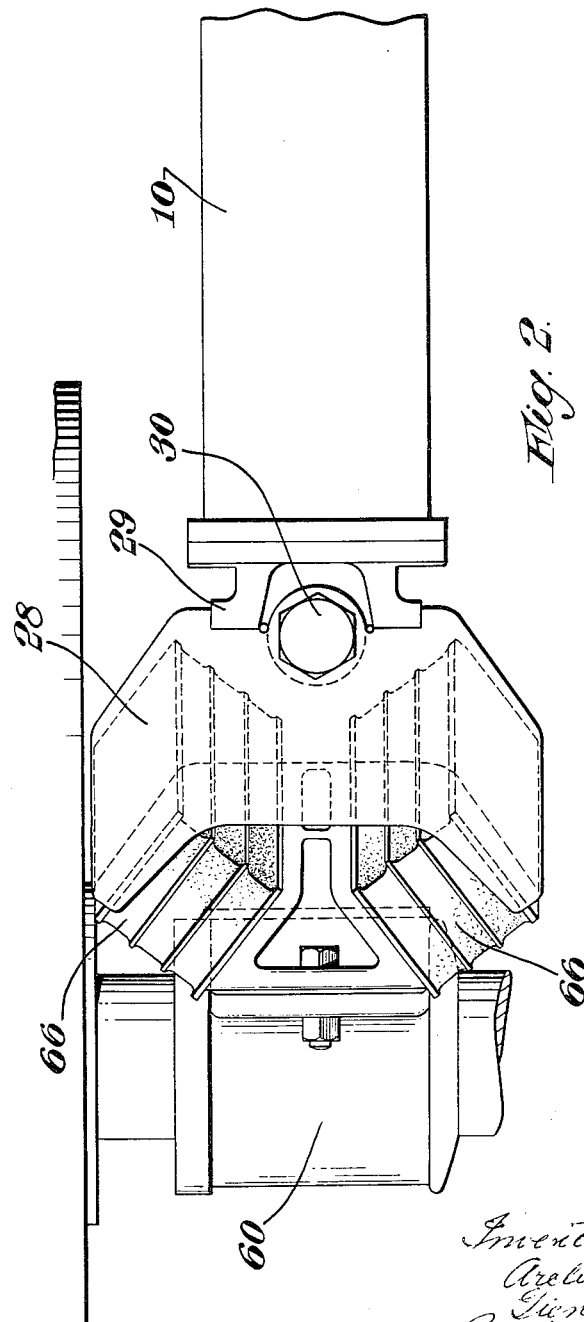

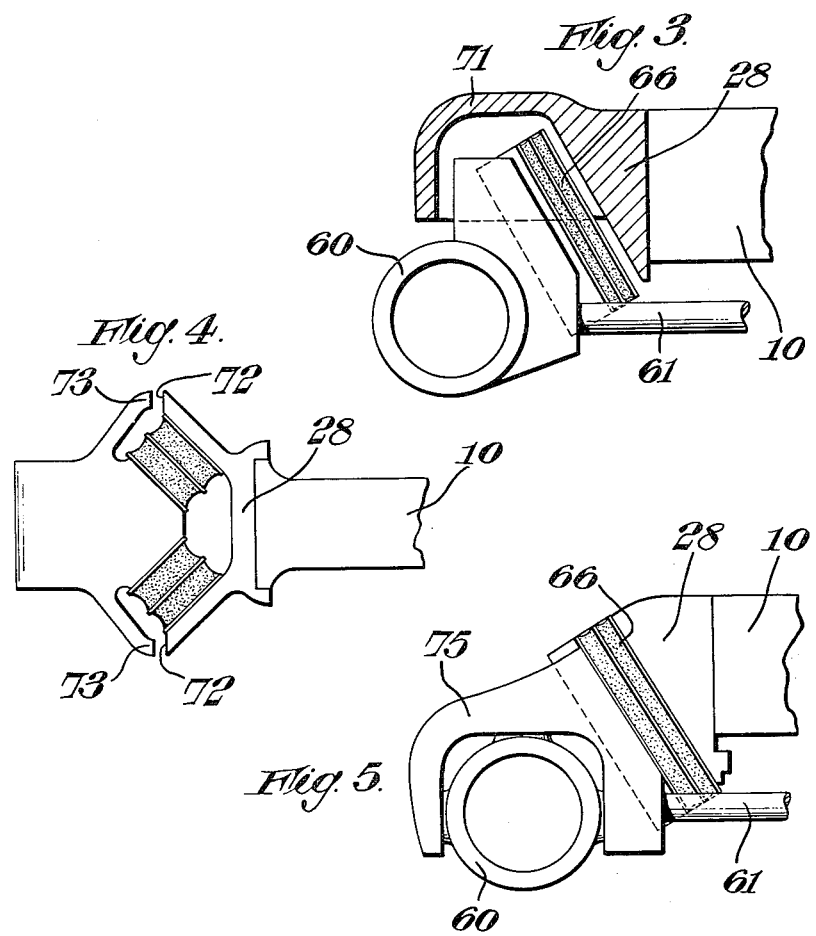

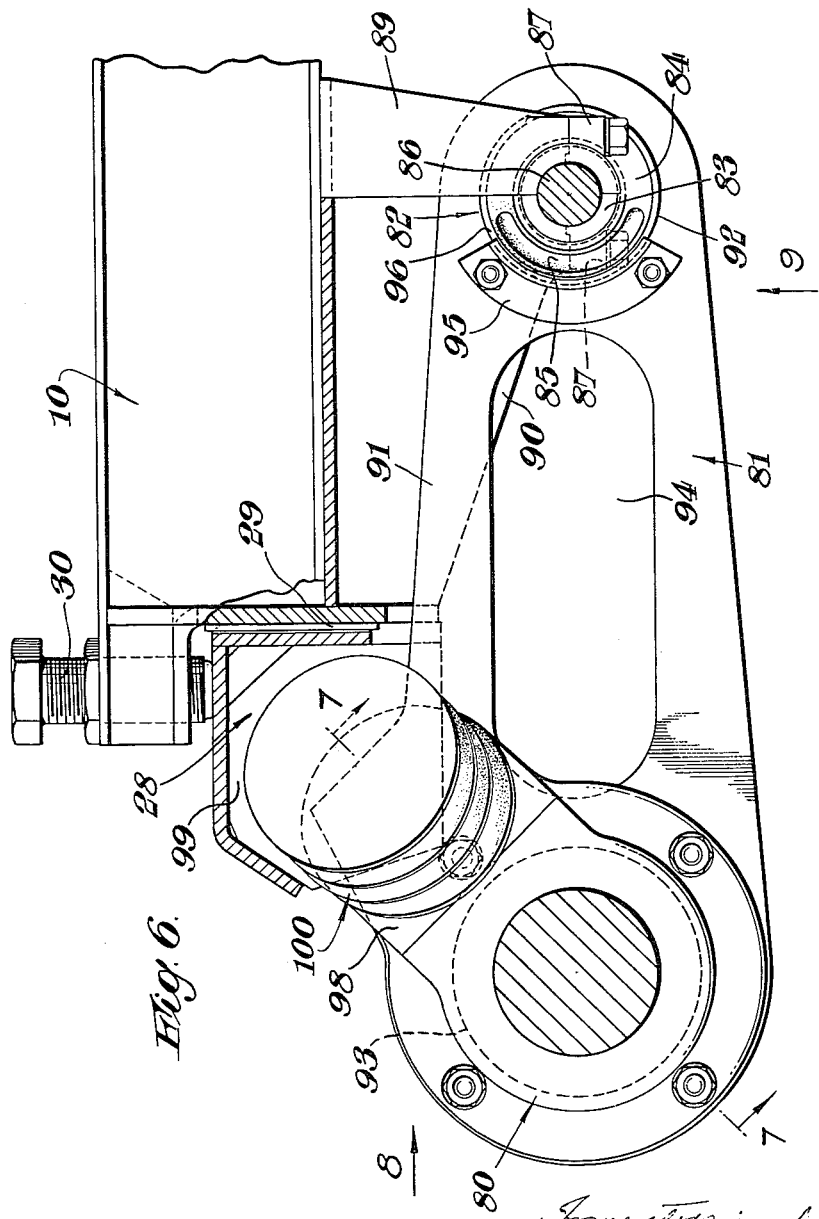

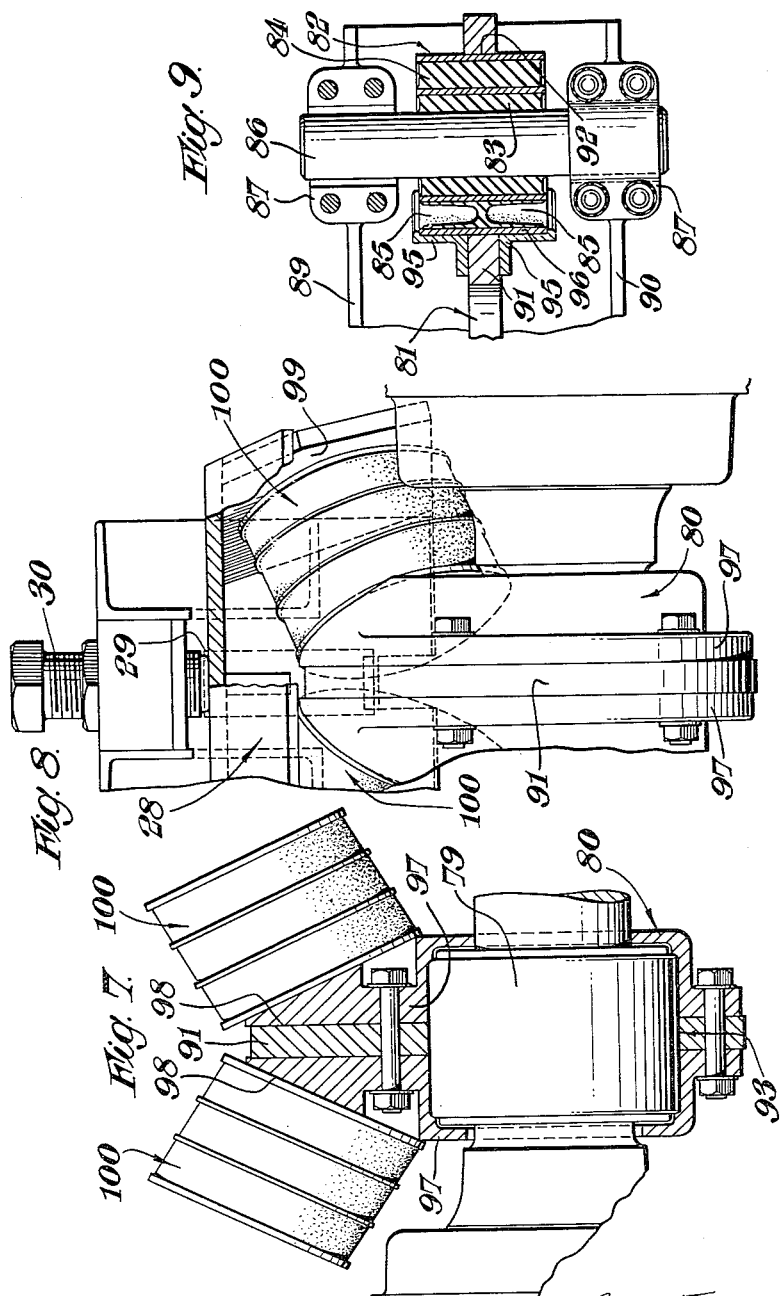

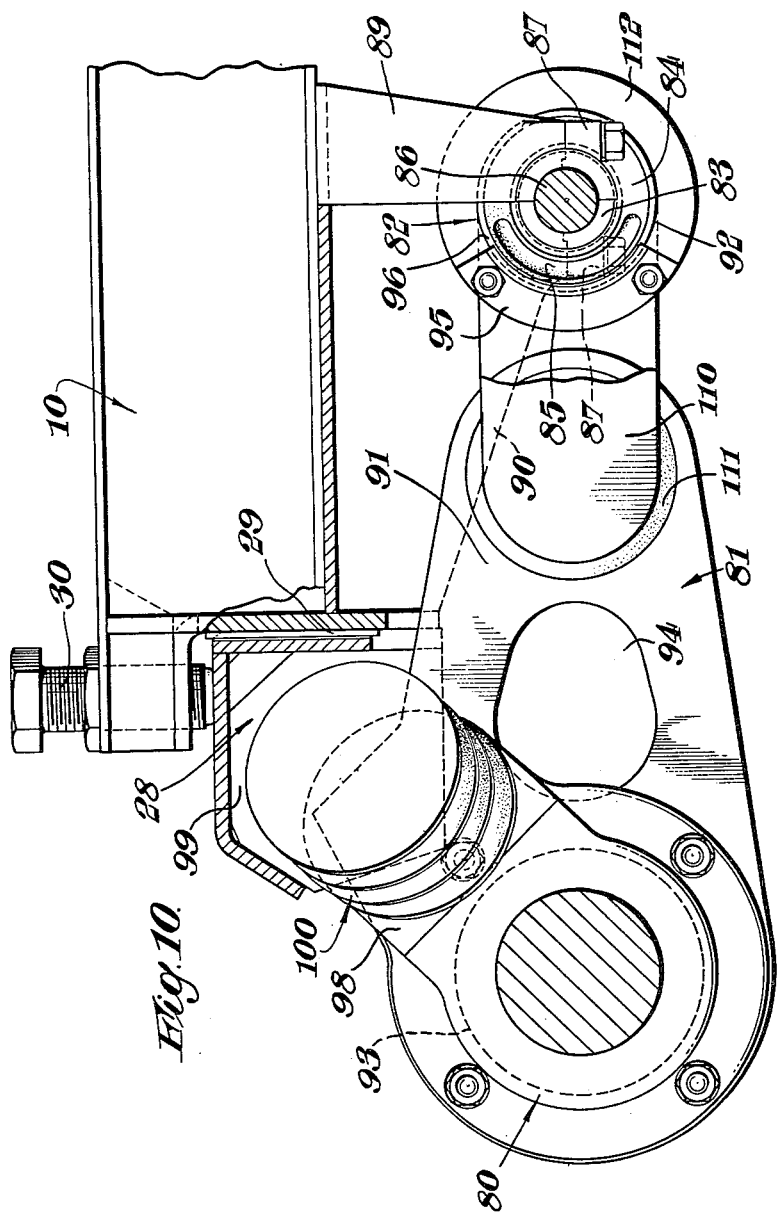

3,099,967
VEHICLE WHEEL SUSPENSIONS
Archie John Hirst, Leicester, England, and Glen Liversage, Auckland, New Zealand, assignors to Metalastik Limited, Leicester, England, a British company
Filed May 29, 1961, Ser. No. 113,497
Claims priority, application Great Britain June 17, 1960
19 Claims. (Cl. 105—224.1)

This invention concerns vehicle wheel suspensions.

According to the invention there is provided a vehicle wheel suspension comprising controlling means carrying the wheel and extending on one side of the wheel axle, the controlling means being attached to a frame of the vehicle so as to permit rising and falling movement of the wheel with respect to the frame and transverse movement of the controlling means, said controlling means controlling the position of the wheel longitudinally of the vehicle, and a rubber spring means acting between said controlling means and the frame, which spring means is arranged to resist, in combined shear and compression in the rubber, both rising movement of the wheel with respect to the frame and transverse movements of the controlling means with respect to the frame.

With a suspension as just defined the transverse forces on the controlling means may be controlled mainly by the rubber spring means acting partly in shear and partly in compression, and not by the attachment between the controlling means and the frame.

According to a preferred feature of the invention, the rubber spring means is located adjacent the wheel axle on the side of the axle on which the controlling means extends.

In this way the vertical deflection afforded to the wheel is greater than the spring deflection under a given wheel loading.

Preferably also, the controlling means is attached to the frame by a rubber joint or joints which permit, by distortion of the rubber, the rising and falling movement of the wheel and the transverse movement of the controlling means.

In the preferred constructions the controlling means comprises a radius arm pivoted to the frame for rising and falling movement.

The pivot connection between the controlling means and the frame should permit substantially free rising and falling movement of the control means in a vertical plane for the rising and falling movements of the wheel.

It is preferred that the horizontal component of the thrust in the rubber spring means is sufficient to maintain the controlling means in tension under all operating conditions, and accordingly the load in the controlling means frame attachment acting always in the same direction.

According to a further feature of the present invention the rubber spring means may be constituted by a pair of rubber springs spaced apart transversely and arranged in V-formation.

Where the latter feature is adopted using a radius arm as the controlling means, the radius arm may pass between the rubber springs, the springs being inclined to the vertical as viewed in side elevation. Alternatively the radius arm may be located below the springs, the springs being inclined to the vertical as viewed in side elevation.

The present invention is particularly applicable to a railway vehicle wheel suspension, in which case the controlling means includes an axle box housing for the axle box of the wheel.

The controlling means including an axle box housing may be connected to a bogie frame of the vehicle, and a suspension in accordance with the invention as applied to a railway vehicle bogie offers considerable advantages, when coupled with disc and single sided brakes, in reducing the frame length of the bogie and therefore the moment of inertia of the frame.

Specific embodiments of the present invention will now be described merely by way of example with reference to the accompanying drawings in which:

FIG. 1 is a side elevation, part in section, of a railway vehicle wheel suspension according to the invention, FIG. 2 is a plan view of the suspension shown in FIG. 5, FIGS. 3, 4 and 5 show, diagrammatically, certain safety arrangements which may be adopted with the construction of FIGS. 1 and 2, FIG. 6 is a side elevation, in part in section, of a further railway vehicle wheel suspension according to the invention, FIG. 7 is a cross-section on line 7—7 in FIG. 6, FIG. 8 is a view in the direction of arrow 8 in FIG. 6, with a part broken away to show further details of construction, and FIG. 9 is an underneath view, in part in section, in the direction of arrow 9 in FIG. 6, and showing a part of the suspension shown in FIG. 6, and FIG. 10 is a side elevation of the wheel suspension shown in FIGS. 6 to 9 but including a modification.

In the following description of the various specific embodiments of the invention like parts are indicated by like reference numerals.

The suspension shown in FIGS. 1 and 2 is designed for a railway vehicle having non-self-aligning axle boxes.

The axle box housing 60 is mounted on the free end of a radius arm in the form of a tension link 61 by means of a hemi-sperical joint 62 having an interlayer of rubber 63. The rubber pivot member at the inner end of the tension link 61 is again formed by a hemi-spherical rubber inter-layer 64 of a hemi-spherical joint 65 as in the previous example.

The link 61 is in line with the axle centre and the joint 65 so as to be in direct tension under the longitudinal forces.

Two rectangular, flat, inter-leaved, bonded rubber springs 66, 66, spaced transversely of the vehicle arranged in V-formation between part 28 carried from a vertically disposed guide 29 attached to a frame 10 of the bogie and the housing 60. Thus the springs 66, 66 are set in equivalent fashion to a chevron spring. In the construction of FIGS. 1 and 2 the radius arm is substantially free from lateral bending and twisting movements.

The tension link 61 may constrain the wheel to move vertically on an arcuate path.

If the conical stiffness of the springs 66 is made much greater than that of the hemi-spherical joint 62 the axle box housing may be made to rise and fall on an arcuate path without tipping of the axle box relative to the bogie frame. In suitable circumstances to achieve this effect the link 61 may be set a little lower, i.e. so as to be offset from the axle centre.

The arrangement of the springs 66 is such that the link 61 is maintained in tension under all operating conditions.

As a safety measure, the free end of the link 61 lies in close relation to a face 67 on the axle box housing so that if the link gets into compression it cannot move very far in relation to the axle box housing. To support the link in these circumstances a stop (not shown) is provided on the bogie frame 10 immediately behind the inner end 68 of the link.

The construction of FIGS. 1 and 2 may be adapted to self-aligning axle boxes by omitting the hemi-spherical joint 62, making the tension link rigid with the axle box housing, and replacing the hemi-spherical joint 65 by a radially-compressed rubber bush pivot, transverse swinging movement of the radius arm being accommodated by conical deformation of the bush. In this case a heavier link is required to take the increased bending moment in the transverse direction. The substitution of the rubber bush pivot is required to provide the necessary stability against the twisting moment on the link 61 due to the offset of the springs 66 above the centre line of the link. This twisting moment occurs of course only with self-aligning axle boxes where the axle box housing is rigid with the radius arm or tension link. Every attempt should be made to maintain the tension link directly in line with the wheel axis and the bush pivot at its inner end so that the link is subjected to substantial bending only by the transverse loads.

The construction of FIGS. 1 and 2 may be modified so that should the rubber springing fail, the axle box-wheel set cannot come adrift from the bogie frame or otherwise collapse in relation thereto. To this end the part 28 may be formed as a hood 71 enclosing the springs 66 and a part of the axle box housing 60 (as shown diagrammatically in FIG. 3) to support the axle box housing directly from the frame 10 if the springing should fail. Alternatively the part 28 may have inclined faces 72 to abut with corresponding faces of wings 73 on the axle box housing as shown diagrammatically in FIG. 4.

Instead of bolting the axle box housing to the spring abutment on the tension links 61 it may be received within and held in position by a frame 75 as shown in FIG. 5 solely under the action of the vertical load.

The suspension shown in FIGS. 6 to 9 is for a railway vehicle having non-self-aligning axle boxes 79 but in which nevertheless the axle box housing, generally indicated at 80, is rigid with the radius arm 81. To avoid excessive transverse bending stresses in the radius arm under the transverse loading, the pivot member 82 at the inner end of the radius arm is constituted so that transverse movement of the whole radius arm may take place with the radius arm remaining normal or substantially normal to the axle. Thus in the present example the radius arm is arranged so as to move substantially bodily in the transverse direction under transverse loading.

A pivot member 82 of many different forms may be used to achieve this effect. In the present example the pivot member 82 is constituted by a rubber bush assembly which permits transverse bodily movement of the radius arm by shearing of the rubber. A substantial radial thickness of rubber is required for this purpose and a double concentric bush is therefore conveniently employed, the inner bush 83 which is in radial precompression having a radial thickness about one half that of the outer bush 84, to give the required radial load capacity, and the outer bush which is also in radial pre-compression being cored out, as at 85, on the unladen side so as to give a low resistance to transverse bodily movement of the radius arm, i.e. axial deflection of the outer bush, and also low resistance to rising and falling movement of the radius arm, which is accommodated mainly by torsional shear in the inner bush.

The inner bush 83 is mounted on a central pin 86 or the like which is clamped in trunnion blocks 87 one on each side of the pivot member 82, the trunnion blocks being carried by brackets 89, 90 depending from the bogie frame 10, one on each side of the radius arm.

When the suspension is set up the pin 86 may be clamped in the trunnion blocks in any position in which it assembles so that lateral stressing of the radius arm is avoided in the event of dimensional errors in the bogie frame.

The radius arm is formed from a steel plate 91 having, at its inner end a hole 92 receiving the pivot member 82, and at its outer end a hole 93 receiving the axle box 79. Intermediate these holes the plate is cut away as at 94 to lighten the plate. The plate 91 is clamped to the pivot member 82 by part-circular clamping brackets 95 bolted to the plate and gripping on the outer metal sleeve 96 of the outer bush 84.

At its outer end the plate 91 carries a pair of bolted on cup-like parts 97 one on each side, these together forming the housing for the axle box.

The parts 97 are extended upwardly, and inwardly of the axle box towards the pivot member 82, to provide a pair of flat abutment faces 98 for the rubber springs, the faces 98 being symmetrically arranged in V-formation with respect to the long axis of the radius arm and inclined to the vertical and horizontal directions.

The rubber springs, two in number, are of cylindrical form, generally indicated at 100 and have metal interleaves and end plates bonded to the rubber. The springs 100 are spaced transversely one on each side of the radius arm and arranged in V-formation with their lower end plates attached one each to the abutment faces 98. The upper end plates of the springs are attached to abutment faces 99 on the part 28 which in the present example is fabricated from sheet metal parts welded together.

The springs 100 are upwardly inclined from the faces 98 to the faces 99 each being set with its cylindrical axis at an angle of 45° to the vertical as viewed in side elevation, the angle between the cylindrical axes of the springs being 140°.

Instead of a steel plate 91, the radius arm may be a forging formed with bosses at both ends one to receive the pivot member 82 and the other to receive the axle box.

The setting of the springs 100 is such that the rubber is loaded in the most convenient ratio, and the radius arm is kept in tension under all operating conditions. Since the radius arm is maintained always in tension the core 85 in the outer bush 84 of the pivot member 82 is on the unladen side of the bush 84.

Maintenance of tension in the radius arm enables a relatively lightweight arm to be used. However the tension in the arm, due to the spring setting should be kept to a minimum, consistent with the springing characteristics required.

With the construction described with reference to FIGS. 6 to 9 the radius arm and the radius arm pivot member are relieved of twisting due to the offset of the springs 100 from the axle centre because non-self aligning boxes are employed. Thus torque developed by transverse loads on the axle boxes being resisted by the springs 100 at a point above the axle box centres is taken in bending by the axles, and the same applies to torque developed by roll movement due to the offset.

The construction of FIGS. 6 to 9 may be modified in that radius arm 81 is not connected to brackets 89, 90 directly and instead the arm is coupled to the brackets by a short longitudinal link 110 pivoted at its ends respectively to the arm 81 and the brackets for vertical movement. The link pivots may incorporate rubber bushes 111 which act in torsion with rising and falling movement of the link.

The term "rubber" as used in this specification should be taken to include rubber-like material.

We claim:

1. A vehicle wheel suspension comprising controlling means carrying the wheel and extending on one side of the wheel axle, the controlling means being attached to a frame of the vehicle so as to permit rising and falling movement of the wheel with respect to the frame and transverse movement of the controlling means, said controlling means controlling the position of the wheel longitudinally of the vehicle, and a rubber spring means acting between said controlling means and the frame, which spring means is inclined with respect to the vertical and transverse directions so as to resist, in combined shear and compression in the rubber, both rising movement of the wheel with respect to the frame and transverse movements of the controlling means with respect to the frame.

2. A vehicle wheel suspension as claimed in claim 1, wherein the rubber spring means is located adjacent the wheel axle on the side of the axle on which the controlling means extends.

3. A vehicle wheel suspension as claimed in claim 1, wherein the controlling means is attached to the frame by a rubber joint which permits, by distortion of the rubber, the rising and falling movement of the wheel and the transverse movement of the controlling means.

4. In a railway vehicle having non-self aligning axle boxes, a wheel suspension comprising a radius arm, a flexible joint connecting the radius arm with an axle box housing of a wheel, to permit alignment of the axle box of the wheel, a pivot joint connecting the radius arm with a frame of the vehicle to permit rising and falling movements of the wheel and transverse swing movements of the radius arm, and a pair of rubber springs acting between the axle box housing and the frame, the rubber springs being spaced transversely of the vehicle, arranged in V-formation as viewed in plan, and each being similarly inclined with respect to the vertical as viewed in side elevation, whereby the springs resist, in combined shear and compression in the rubber, both rising movement of the wheel and transverse swinging movement of the radius arm, the springs being set at a sufficient inclination to provide a component of thrust in the direction of the radius arm which maintains the radius arm in tension under all operating conditions, the radius arm passing between the rubber springs with its long axis intersecting the wheel axis.

5. A wheel suspension as claimed in claim 4, wherein said flexible joint comprises a part-spherical rubber layer interposed between corresponding hemi-spherical surfaces of parts on the axle box housing and the radius arm respectively, the rubber layer being held compressed between said surfaces by the tension in the radius arm.

6. A wheel suspension as claimed in claim 5, wherein the conical stiffness of the rubber springs is considerably greater than the flexible joint.

7. A wheel suspension as claimed in claim 4, wherein said pivot joint comprises a hemi-spherical rubber layer interposed between corresponding part-spherical surfaces of parts on the radius arm and the frame respectively, the rubber layer being held compressed between said surfaces by the tension in the radius arm.

8. In a railway vehicle having non-self aligning axle boxes, a wheel suspension comprising a radius arm rigid with the axle box housing of a wheel and pivoted to a frame of the vehicle so as to permit rising and falling movements of the wheel and transverse bodily movements of the radius arm with respect to the frame, and a pair of rubber springs acting between the axle box housing and the frame, the rubber springs being spaced transversely of the vehicle, arranged in V-formation as viewed in plan, and each being similarly inclined with respect to the vertical as viewed in side elevation, whereby the springs resist, in combined shear and compression in the rubber, both rising movement of the wheel and transverse bodily movement of the radius arm, the springs being set at a sufficient inclination to provide a component of thrust in the direction of the radius arm which maintains the radius arm in tension under all operating conditions, the radius arm passing between the springs with its long axis intersecting the wheel axis.

9. A railway vehicle as claimed in claim 8, wherein the radius arm is pivoted to the frame by a rubber bush pivot having its axis set transversely of the vehicle whereby the pivot permits rising and falling movement of the radius arm by distortion of the rubber in torsion and transverse bodily movement of the radius arm by distortion of the rubber in axial shear.

10. A railway vehicle as claimed in claim 9, wherein the rubber bush pivot is in the form of a double concentric rubber bush comprising inner and outer sleeves of rubber.

11. A railway vehicle as claimed in claim 10, wherein one of said sleeves of rubber is cored out on the side adjacent the axle box housing.

12. A railway vehicle as claimed in claim 9, wherein the rubber bush pivot is fixed on a central pin adjustable axially in trunnion blocks on the frame, the trunnion blocks clamping the pin against rotation.

13. A railway vehicle as claimed in claim 9 in which the radius arm is pivoted to a longitudinal link which is pivoted to the frame, the pivots incorporating said rubber bush pivots.

14. A vehicle wheel suspension comprising a radius arm carrying the wheel and extending on one side of the wheel axle, the radius arm being pivoted to a frame of the vehicle so as to permit rising and falling movement of the wheel with respect to the frame and transverse movement of the radius arm, the radius arm controlling the position of the wheel longitudinally of the vehicle, and rubber spring means acting between a part on the radius arm and a part on the frame, said rubber spring means being located adjacent the wheel axle on the side thereof on which the radius arm extends and being inclined with respect to the vertical and transverse directions to resist, in combined shear and compression in the rubber, both rising movement of the wheel and transverse movements of the radius arm with respect to the frame, the spring means being set at sufficient inclination to provide a component of thrust in the direction of the radius arm which maintains the radius arm in tension under all operating conditions.

15. A vehicle wheel suspension comprising controlling means carrying the wheel and extending on one side of the wheel axle, the controlling means being attached to a frame of the vehicle so as to permit rising and falling movement of the wheel with respect to the frame and transverse movement of the controlling means, said controlling means controlling the position of the wheel longitudinally of the vehicle, and a pair of rubber springs acting between said controlling means and the frame, said rubber springs being spaced transversely of the vehicle, arranged in V-formation as viewed in plan, and each similarly inclined with respect to the vertical as viewed in side elevation, whereby said springs resist, in combined shear and compression in the rubber, both rising movement of the wheel with respect to the frame and transverse movements of the controlling means with respect to the frame.

16. A vehicle wheel suspension comprising a radius arm carrying the wheel and extending on one side of the wheel axle, the radius arm being pivoted to a frame of the vehicle so as to permit rising and falling movement of the wheel with respect to the frame and transverse movement of the radius arm, the radius arm controlling the position of the wheel longitudinally of the vehicle, and a pair of rubber springs acting between parts on the radius arm and parts on the frame, said rubber springs being spaced transversely of the vehicle, arranged in V-formation as viewed in plan and similarly inclined to the vertical as viewed in side elevation, whereby the springs resist, in combined shear and compression in the rubber, both rising movement of the wheel and transverse movement of the radius arm with respect to the frame, the radius arm passing between the springs with its long axis intersecting the wheel axis.

17. In a railway vehicle having self aligning axle boxes, a wheel suspension comprising a radius arm rigid with the axle box housing of a wheel and pivoted to a frame of the vehicle so as to permit rising and falling movements of the wheel and transverse movements of the radius arm with respect to the frame, and rubber spring means acting between the axle box housing and the frame, said rubber spring means being inclined with respect to the vertical and transverse directions, to resist in combined shear and compression in the rubber, both rising movement of the wheel and transverse movements of the radius arm with respect to the frame.

18. In a railway vehicle having non-self aligning axle boxes, a wheel suspension comprising a radius arm, a flexible joint connecting the radius arm with an axle box housing of a wheel, to permit alignment of the axle box of the wheel, a pivot joint connecting the radius arm with a frame of the vehicle to permit rising and falling movements of the wheel and transverse swing movements of the radius arm, and rubber spring means acting between the axle box housing and the frame, said rubber spring means being inclined to the vertical and transverse directions, to resist in combined shear and compression in the rubber, both rising movements of the wheel and transverse movements of the radius arm with respect to the frame.

19. In a railway vehicle having non-self aligning axle boxes, a wheel suspension comprising a radius arm rigid with the axle box housing of a wheel and pivoted to a frame of the vehicle so as to permit rising and falling movements of the wheel and transverse bodily movements of the radius arm with respect to the frame, and rubber spring means acting between the axle box housing and the frame, said rubber spring means being inclined with respect to the vertical and transverse directions to resist in combined shear and compression in the rubber, both rising movement of the wheel and transverse movement of the radius arm with respect to the frame.

References Cited in the file of this patent
UNITED STATES PATENTS

| | | |
|---|---|---|
| 1,331,039 | Zoelly | Feb. 17, 1920 |
| 2,197,727 | Ledwinka | Apr. 6, 1940 |